P. M. STEPHAN.
TIRE ARMOR.
APPLICATION FILED APR. 24, 1909.

967,457.

Patented Aug. 16, 1910.

Witnesses:

Inventor
Paul M. Stephan.
By Geo. H. Strong
His Attorney

UNITED STATES PATENT OFFICE.

PAUL M. STEPHAN, OF SAN FRANCISCO, CALIFORNIA.

TIRE-ARMOR.

967,457. Specification of Letters Patent. Patented Aug. 16, 1910.

Application filed April 24, 1909. Serial No. 491,898.

*To all whom it may concern:*

Be it known that I, PAUL M. STEPHAN, citizen of the United States, residing in the city and county of San Francisco and State of California, have invented new and useful Improvements in Tire-Armor, of which the following is a specification.

My invention relates to tire protectors, and especially pertains to a flexible armor for automobile tires.

The invention consists of the parts and the construction and combination of parts, as hereinafter more fully described and claimed, having reference to the accompanying drawings, in which—

Figure 1:
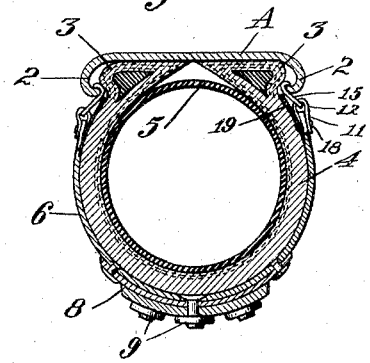
Figure 2:
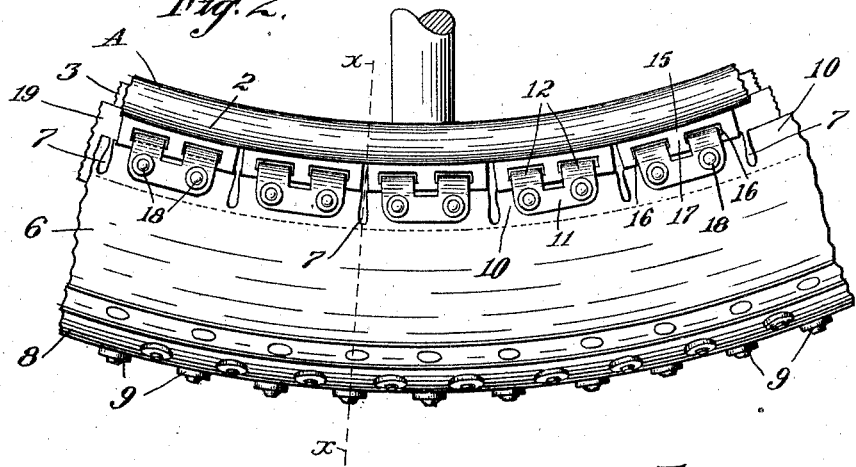
Figure 3:
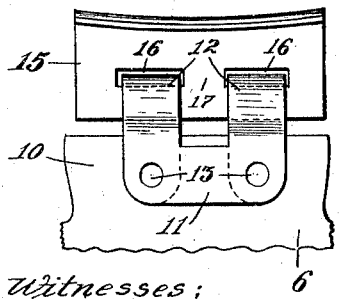
Figure 4:
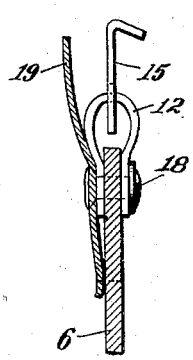
Figure 5:
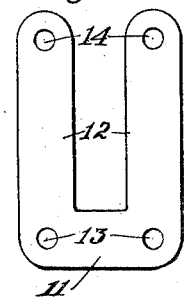

Figure 1 is a sectional view of my improved tire armor in place on the tire, the section being on the line X—X of Fig. 2. Fig. 2 is a side elevation of a part of the tire with my improvements applied. Fig. 3 is an enlarged detail of a portion of the armor showing a metal stirrup in place. Fig. 4 is a sectional view of Fig. 3. Fig. 5 is a detail of a stirrup blank detached.

A represents an ordinary clencher rim, having the clencher flanges 2 adapted to engage and grip the corresponding flanges 3 of the tire 4, and hold the latter in place. The tire is inflated by the usual inner tube 5.

My tire armor comprehends a flexible leather strip 6, practically encircling the whole tire, with the edges of the strip brought down to within a half inch of the rim, and suitably notched, as shown at 7, so as to enable this armor strip to accommodate itself to the curvature of the tire. This strip along its tread portion is suitably reinforced by one or more plies of leather, as shown at 8, and protected by the suitably headed rivets 9.

Secured to the flap portions 10 at each side of the strip are metal stirrups, each of which has a blank, shown in Fig. 5, which comprises a base section 11, with parallel spaced side sections 12. The blanks adjacent to the ends of the base section 11, and the ends of the side sections 12, are perforated as shown at 13—14, so that when these stirrups are secured to a flap 10, and the free ends of the side sections 12 bent underneath a flap, a stirrup may be riveted to a flap at two separated points, the clip being a closed clip, and forming a hinge connection for the hook-shaped plate 15 which is so bent and shaped as to grip a rim flange 2 between the latter and the tire flange 3. The essence of this invention resides in the peculiar construction and arrangement of these hinge clips and hook plates 15. These hook plates 15 have two lengthwise extending slots 16 separated by a reinforcing rib 17; the slots being for the purpose of accommodating the loop members 12.

The loop members are closed, that is, the base section 11 of a loop member is secured to the outside of a flap, and the perforated ends of the loops 14 are bent in underneath the flaps after being passed through the slots 16 of the hooks, and riveted together by the rivets 18.

The hook plates 15 have a length considerably in excess of the width of the section 11 of the loop members, each hook being approximately twice as long as a loop. This is all very important in practice, because experience shows in the use of these devices with heavy cars that a long bearing of the hook member on the rim is essential in order to prevent the hooks being broken off; and it is also quite important, and in fact essential to use a closed clip with bifurcated loop members passing through holes in the hook at separated points. The reason for this is to prevent the clips or loops having a swivel action in the holes of the hook, because it has been found that by using a single loop member, or a clip having a single loop, passing through a single hole in the clip, that there was more or less rocking of the clip in the hook plate, resulting in the swivel action and a grip of the armor around the tire, and it was almost impossible to make clips and hooks strong enough to withstand the strain due to the tractive force of the armor on the ground as the car traveled rapidly. I have found that I could not make these clips and hooks strong enough to prevent their breaking until I devised the bifurcated plan of clip, and double perforated hook plate, as here shown. It is also essential that the clip be secured to the tractive strip 6 as close to the rim as possible.

In order to exclude dirt and water from the tire, I secure a protective apron or flap 19 to each side of the inside of the strip 6, and just above the rivets 18, bringing this flap down in back of the hook plates 15. These protective aprons protect the rubber tire entirely from contact with the sheet steel of which the clips and hooks are made, and prevents all rim cutting.

Having thus described my invention, what I claim and desire to secure by Letters Patent is—

An improved armored tire consisting of a clencher rim and a clencher tire, a protective armored strip of flexible material encircling the tire with the edges of the strip positioned proximate the rim, said edges being notched at intervals to enable the strip to accommodate itself to the curvature of the tire, metal stirrups secured to said edges between the notched portions thereof, each of said stirrups comprising a base section and parallel spaced side sections, said side sections being folded over upon themselves, hook plates engaging the rim, each having two separated slots receiving the separated looped portions of the stirrups, and two sets of rivets passed through each stirrup and the strip and securing the stirrup to the strip at two separate points.

In testimony whereof I have hereunto set my hand in presence of two subscribing witnesses.

PAUL M. STEPHAN.

Witnesses:
MAX F. PLAGEMANN,
WM. J. WOLF.